July 22, 1952 G. E. G. GRAHAM 2,604,534

APPARATUS FOR CONTROLLING SCANNING ACCURACY OF CATHODE-RAY TUBES

Filed Dec. 4, 1946 2 SHEETS--SHEET 1

INVENTOR.
GEORGE E. G. GRAHAM
BY

ATTORNEY

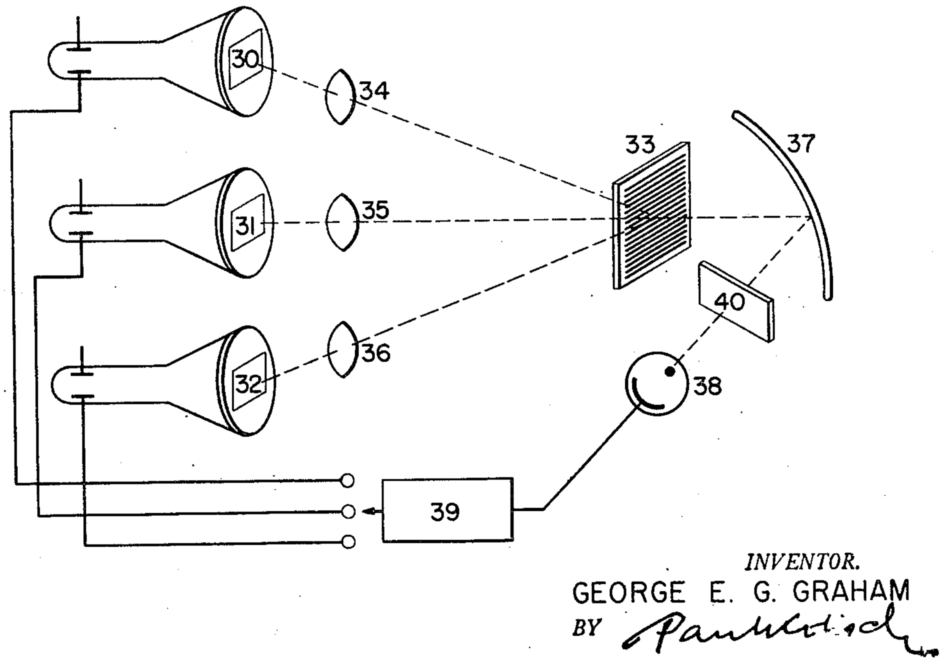
INVENTOR.
GEORGE E. G. GRAHAM
BY Paul Whitlock[signature]
ATTORNEY

Patented July 22, 1952

2,604,534

UNITED STATES PATENT OFFICE 2,604,534

APPARATUS FOR CONTROLLING SCANNING ACCURACY OF CATHODE-RAY TUBES

George E. G. Graham, London, England, assignor to Cinema-Television Limited, London, England, a corporation of England Application December 4, 1946, Serial No. 714,085
In Great Britain August 2, 1946

4 Claims. (Cl. 178—6.8)

This invention relates to scanning improvements in television and other systems in which an image to be transmitted is analyzed by a process of scanning at a transmitter and is reconstituted by a similar scanning process at one or more receivers.

In present systems it is frequently the practice to initiate the return stroke of the scanning spot at the end of a line or of a complete frame, or both, by means of a synchronizing signal so that the image synthesized at the receiver shall be a more or less accurate reproduction of the image presented to the transmitter pickup element. The type of system employed according to the present example, however, uses synchronization only at the start of a line or a frame, or of both, depending on what scans are to be controlled. Consequently uncorrected discrepancies between the forms of scanning waves used for forming time bases in the transmitter and in any associated receiver will cause image distortion such as cramping of certain parts of the reconstituted image in relation to others of its parts.

Accordingly the present invention has as its object the devising of means adapted to exert a close control of the position of the scanning spot, not merely at the start (and/or end) of a line or frame, but throughout the scanning process thereof, or at least throughout a considerable part of it. In this way distortion effects caused by non-linearity of the scanning wave forms at the transmitter or at any of its receivers, can be avoided, and cramping effects such as the distortion mentioned above can be virtually eliminated.

It is a further object of the invention that the scanning control apparatus be advantageously applicable to systems employing specialized scanning such as the interlaced scanning of stereoscopic and/or color television systems, where especially close control of the position of the scanning spot is essential.

Generally apparatus according to this invention functions in cooperation with and controls a conventional scanning system (which may conveniently be described as performing of its own accord "coarse," i. e., uncorrected, scanning). The coarse scanning should preferably be as substantially free from non-linearity as possible, and should preserve closely a one-to-one correspondence between transmitter and receiver scanning progress, but yet it may have certain inaccuracies such as are usually unavoidable due to manufacturing limitations. In operation, relatively small correcting signals will instantly be generated when necessary, and will be superimposed on the coarse scanning wave forms so as to compensate for such inaccuracies substantially, and to eliminate all scanning errors.

In an alternate arrangement according to this invention, the coarse scanning may be dispensed with entirely and, in effect, correct scanning signals will be synthesized by integrating correction signal increments produced by the apparatus which generates the correcting signals described above.

Generally the apparatus employed to generate correcting signals consists of means for comparing the raster pattern formed by the scanning spot on a fluorescent screen with a master pattern having the desired accuracy.

The comparison can be carried out, for example, by forming an electron-optical or optical image of the raster on an area having a predetermined spatial relationship to the master pattern, and then deriving a correcting signal should any lack of correspondence between any part of the raster and the corresponding part of the master pattern arise. The correction signal could be derived, for example, either directly by electrical means in the case of electron-optical image formation, or indirectly by photoelectric means in the case of optical image formation.

Other objects, features and advantages of the present invention will be apparent to those skilled in the art from the following description taken in connection with the drawings, in which.

Fig. 4 is an embodiment of this invention adapted to control the scanning of apparatus for reproducing color images, in which the color images are synthesized by combining three separate images each of which is produced by a separate kinescope and is in a different color light. The different color rasters emitted by these kinescopes may be superimposed, or interlaced, on a single viewing area by sequential projection from the respective kinescopes.

The embodiments described herein are adapted to secure one-to-one correspondence between the raster formed at the transmitter and that formed at the receiver only in low frequency scanning, i. e. only in the whole frame direction. More particularly it corrects errors in the scanning pattern, which result from non-linearity of the low frequency sweeping voltage, such as crowding or spreading of lines in one part of the picture area with respect to those in the rest of the area. Such errors affect the image produced on the cathode ray tube screen by distorting it in its vertical dimension. However it is within the scope of this invention to employ the principle hereof to monitor high frequency scanning, i. e. to monitor linearity of the scans of individual picture lines and the invention is intended also to cover such latter cases.

Figure 1:
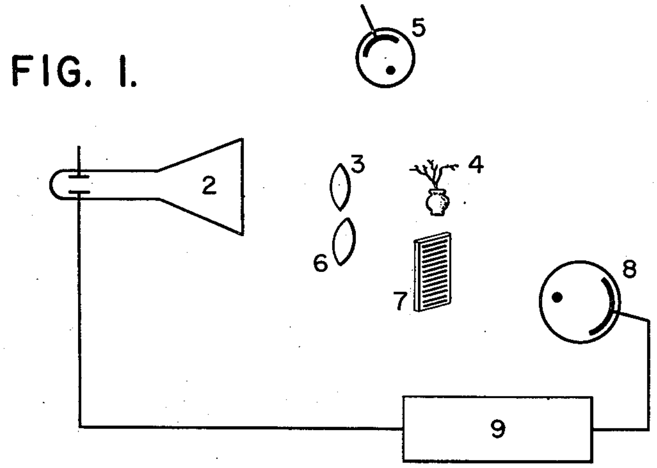
Fig. 1 is a diagrammatic representation of an embodiment of this invention adapted to control the scanning of a cathode ray device which serves to provide a scanning spot of light, i. e. analyzing or area-exploring spot of light, used in one type of image pick-up device.

Cathode ray tube 2 of Fig. 1 represents an image exploring device provided with electrostatic deflecting means; the raster formed by it is focused by lens system 3 onto subject 4 whose image is to be picked up. The light reflected from subject 4 (which is modulated in accordance with the contours and surface eccentricities thereof) falls into a photoelectric cell 5 which furnishes an electrical signal whose amplitude at any instant of time corresponds to the intensity of the light reflected (from a particular elementary area of subject 4 then being illuminated). This part of the system is quite conventional.

The correcting apparatus includes an additional lens system 6 which focuses a projection of the raster generated in tube 2 onto a master pattern which may consist of a transparent plate 7 on which is ruled a series of parallel opaque lines. The spaces between the lines may conveniently be made substantially equal to the width of the lines and the number of lines may be equal to the number of high frequency sweeps, i. e. the number of parallel traces used in scanning a complete frame. Light passing through the transparent spaces of plate 7 will pass into photoelectric cell 8, variations in whose output will comprise the so-called "correction signal." The correction signal is fed via amplifier 9 to the deflecting system of tube 2.

Figure 2:
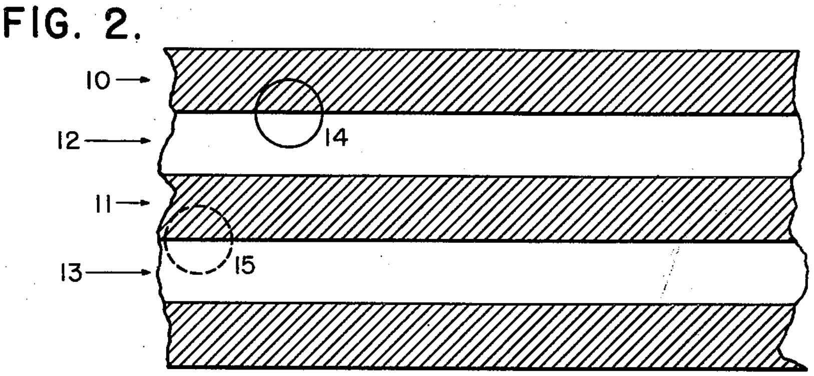
Fig. 2 is a schematic representation of a greatly magnified part of a master pattern according to this invention. It shows two examples of where projections of a scanning spot should impinge thereon at instants of time when the scanning is accurate.

The areas 10 and 11 of Fig. 2 represent magnified portions of areas rendered opaque by lines ruled on plate 7 in order to form the master pattern. The areas 12 and 13 represent magnified portions of spaces, or transparent gaps, between opaque lines. The circle 14 represents an instantaneous optical image or projection of the exploring spot emitted by cathode ray tube 2 in Fig. 1 and projected by lens 6 upon plate 7. The dotted circle 15 represents the optical image of the exploring spot at another instant of time, i. e. later by about the period of one high frequency scan. The image represented by circle 14 is shown in what may be called an equilibrium position. The circuits of the amplifier are arranged, by means well known to the art, so that when the projection of the spot is in this equilibrium position no correcting signal appears at the output of the photoelectric cell or of the amplifier 9. A description of amplifiers of this type is available in the patent to Zworykin, No. 2,415,059, issued January 28, 1947. Should the spot of light emitted by the cathode ray tube screen wander, in a vertical direction, away from the position in which its projection on plate 7 is in an equilibrium position, then either more or less light will pass through the plate into the photoelectric cell. Consequently a correcting signal will be produced in the output of the photoelectric tube and will pass through amplifier 9. The amplifier and its connections to the deflecting plates may be so arranged that when a signal is generated its effect on tube 2 will be to adjust the position of the emitted spot until its projection, such as spot 14, returns to an equilibrium position. Thus the position of the image of the spot, and hence the position of the spot itself on the cathode ray tube screen, is corrected continuously as it moves slowly down in the frame direction even while it is being scanned over and over again in the line direction.

In preferred embodiments it may be desirable to employ means to cut off amplifier 9 during the fly back intervals which occur between the end of each high frequency sweep and the start of the next. Then the downward travel of the spot will again be subject to control as soon as the scanning of another line is under way, i. e. when the projection of the exploring spot again commences to move along straddling the boundary between an opaque line and an adjacent transparent space, as for example when it attains the position of circle 15 after having previously traversed positions along the boundary above, such as that of circle 14.

The opaque lines must be parallel to each other and to the hypotenuse of an imaginary triangle whose base is parallel to the direction of high frequency deflection and is equal in length to the width of the scanned area and whose other side is parallel to the direction of low frequency deflection, is located on the side of the scanned area where high frequency deflections terminate, and is equal in length to the downward movement of the beam projection on the screen during one high frequency deflection. This is necessary since both high and low frequency deflection occur concurrently with the result that during each high frequency deflection the combined deflection moves the beam projection, i. e. the fluorescent spot, across the screen along a path which slopes downward at one end. The master pattern is formed to correspond exactly to a full frame scanning raster formed of many lines which follow the paths of this kind which will result if the high and low frequency deflection voltages have perfectly linear saw tooth wave forms. The snap back from each high frequency deflection is so fast that the downward deflection component during it is negligible. Upon each snap back the beam will be moved from its equilibrium position at the end of the lower edge of one opaque line to a new equilibrium position at the beginning of the lower edge of the opaque line next following it in downward succession on the screen.

Figure 3:
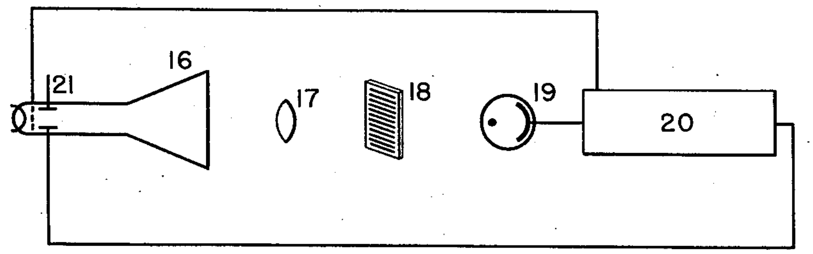
Fig. 3 is a diagrammatic representation of an embodiment of this invention which is employed to correct the scanning of a direct viewing kinescope.

Fig. 3 diagrammatically represents an embodiment of this invention which controls the scanning of a kinescope employed in an even more conventional manner, namely as a directly viewed receiving tube. Here a similar controlling process takes place. Tube 16 is an image synthesizing cathode ray tube. Lens 17 projects an image of the raster onto master plate 18. Photoelectric cell 19 emits correcting signals which are fed via amplifier 20 to the deflecting system 21 of tube 16.

In the case of tube 16, its scanning spot is constantly being intensity modulated with the video signal, as distinguished from that of tube 2, Fig. 1, which is simply a source of constant intensity light. In this case it is important to note, therefore, that spurious correction signals could arise at the output of the photoelectric tube and the amplifier as a result of the varying spot brightness at different points on the screen of the image synthesizing tube, i. e. correction signals which do not necessarily result because instantaneous projections of the spot on master screen 18 are in other than correct equilibrium positions. However this condition is avoided herein in that the video signal is fed not only to the intensity controlling electrode of tube 16, but also to a control element of amplifier 20. It is applied to amplifier 20 in a manner known in automatic volume control practice to sufficiently inversely vary its gain with respect to variations of the component of the photoelectric tube output which results from instantaneous light intensity variations of the picure on the screen of tube 16 so that so long as the projected spot occupies a correct equilibrium position at any instant of time the correcting signal output of amplifier 20 will be zero. A similar result may be obtained by applying the video signal to the input terminal of amplifier 20, along with the output of the photoelectric tube, with the video signal in 180° phase relationship to that portion of the photoelectric tube output which results from light variations from the screen of tube 16 and by adjusting the video signal amplitude to cancel that portion of the photoelectric tube output. This is one of the features of the present invention.

While the principle of this invention can be applied to many kinds of apparatus in which for one reason or another close continuous control of the position of a beam of electrons, or even of positively charged particles, is desirable, there will now be described particular arrangements in which the control system has special advantage.

It has been suggested for color television systems to use a cathode ray tube on the screen of which there are formed a series of lines having three alternating color transparencies, for example, red, green and blue. In such a system it would be essential that the raster of the receiver be a true reproduction of that of the transmitter, otherwise effects more serious than distortion of the proportions of the image will result. For example, at times when the image reconstituting spot should be tracing along red lines no wandering to adjacent green or blue lines is permissible as this would even distort the color of the image. According to the present invention it would be possible to prevent or control such wandering by one or more arrangements in which the photocells are discretely sensitive to light of different colors. During red scanning, photocells could be used which are discretely sensitive to blue only and green only. These cells, of course, would provide the necessary correction signals for restoring the spot should it tend to wander. If, thereafter, the next scan were to be that of the green lines, the green sensitive cell would be biased off, the blue sensitive cell would remain operative, and a red sensitive cell would be cut in. The switching in and out of the various photoelectric cells could be done preferably by pulsing circuits in ways well known to the art.

In another proposed color television arrangement, a plurality of images, for example three, may be formed by means of an equal number of cathode ray tubes. Each image would be of a different color such as red, blue or green, and they would be superimposed upon each other by optical projection. It is obvious that the component images must be very accurately identical so far as scanning dimensions are concerned and for attaining this accuracy the present invention is especially suitable.

In Fig. 5 three color images 30, 31 and 32 are projected sequentially onto a ground glass viewing screen 33 with the assistance of lens systems 34, 35 and 36. A master pattern of parallel opaque lines of the kind already described is ruled on the rear surface of ground glass screen 33. Light passing through the transparent spaces is collected by an optical system which may include concave mirror 37 for receiving light from any part of screen 33 and a photocell 38 upon the light sensitive element of which the light is focused by the mirror. It is desirable that the amplitude of any correction signal generated by the photoelectric cell should depend on the amount by which the instantaneous projection of the light spot on the master pattern has departed from its equilibrium position, and that it should not depend on the color of the frame being scanned because the photoelectric cell is unequally sensitive to light of different colors. To render the photoelectric cell equally sensitive to red, blue and green light, it may be desirable to employ a filter 40 which will filter out predetermined portions of the light of different colors to such an extent as to equalize their final effect on the photoelectric cell. The input of cell 38 after it has passed through amplifier 39 may be appropriately switched by known electronic switching means so that at any given instant it reaches the image reconstituting tube, i. e. one of the kinescopes, 30, 31, and 32, which is emitting light at that instant.

It is obvious that other means may be employed to equalize sensitivity of the photocell during successive intervals during which it monitors different mono-color scans. For example, its anode potential may be sequentially altered by applying to it during the successive emittings of the several kinescopes a succession of square waves each having an appropriate predetermined amplitude for readjusting the input light to output light voltage characteristic of cell 38, so that the cell will operate with the same characteristic for light of different colors even though its cathode be unequally sensitive to different kinds of light. It is also obvious that, though not shown in Fig. 4, this embodiment will employ means for effectively cancelling from the complex signal, which is processed by amplifier 39, the component of the output of cell 38 which results from light intensity variations when pictures are being synthesized on the screens of the several kinescopes, i. e. by an arrangement similar to that of Fig. 3 whereby the source of video signals is connected to the amplifier at an appropriate point for applying inverse automatic volume control or at the input to the amplifier for cancelling the undesired component.

What is claimed is:

1. Scanning control apparatus comprising a cathode ray tube, a fluorescent screen on said tube, an exploring scanning spot emitted by said tube, means for deflecting said spot, a scanning light raster formed upon said fluorescent screen by said spot, said raster having a number of parallel traces, a plate associated with said tube and optically aligned with said light raster, a number of parallel opaque and transparent subdivisions arranged on said plate parallel to and in accordance with the lines of an accurate scanning light raster and forming a master pattern, optical means for projecting the scanning light raster upon said plate in such a position with respect to the subdivision thereof that at any instant a predetermined amount of light passes through said plate if the scanning spot is accurately deflected and there is no lack of correspondence between the emitted raster and the master pattern and a different amount of light passes through said plate if the scanning spot is inaccurately deflected and there is a lack of correspondence between the emitted raster and the master pattern resulting in a light variation due to said deflecting inaccuracy, means for translating the resultant light variations into electrical signals and means for applying the electrical signals to the deflecting means to deflect the spot in the direction transverse to said traces for opposing the deflection inaccuracy.

2. Scanning control apparatus according to claim 1, and in which the scanning spot is of uniform brightness during the forming of a scanning light raster and further comprising means provided for intercepting other light of the scanning spot and for projecting it onto an object, and means for receiving light reflected from said object and for translating variations in the light level into electrical picture signals.

3. Scanning control apparatus according to claim 1, and in which the number of parallel opaque subdivisions of the plate is equal to the number of traces of the emitted light raster and said master pattern is spatially positioned so that the subdivisions thereof are parallel to the traces of the accurate light raster so that each trace of the accurate light raster falls with halves of its area respectively upon an opaque and a transparent subdivision of said surface.

4. Scanning control apparatus according to claim 1, and in which the means for translating the variations of light into electrical signals is a photoelectric cell.

GEORGE E. G. GRAHAM.

REFERENCES CITED

The following references are of record in the file of this patent:

UNITED STATES PATENTS

| Number | Name | Date |
|---|---|---|
| 1,745,528 | Clark | Feb. 4, 1930 |
| 2,037,035 | Lubcke | Apr. 14, 1936 |
| 2,188,679 | Dovaston et al. | Jan. 30, 1940 |
| 2,385,563 | Beers | Sept. 25, 1945 |
| 2,415,059 | Zworykin | Jan. 28, 1947 |
| 2,457,911 | Munster | Jan. 4, 1949 |
| 2,458,291 | Munster | Jan. 4, 1949 |
| 2,476,698 | Clapp | July 19, 1949 |
| 2,490,812 | Huffman | Dec. 13, 1949 |

FOREIGN PATENTS

| Number | Country | Date |
|---|---|---|
| 522,495 | Great Britain | June 19, 1940 |